(12) United States Patent
Perkins et al.

(10) Patent No.: US 10,688,885 B2
(45) Date of Patent: Jun. 23, 2020

(54) VEHICLE SEAT MEMORY FROM REMOTE DEVICE

(71) Applicant: FORD GLOBAL TECHNOLOGIES, LLC, Dearborn, MI (US)

(72) Inventors: Amanda Perkins, Belleville, MI (US); Jason Shomsky, Brownstown, MI (US); Paul James Novak, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 15/818,024

(22) Filed: Nov. 20, 2017

(65) Prior Publication Data
US 2019/0152349 A1    May 23, 2019

(51) Int. Cl.
| B60N 2/02 | (2006.01) |
| B60K 35/00 | (2006.01) |
| B62D 1/181 | (2006.01) |
| B60K 23/00 | (2006.01) |
| B62D 1/18 | (2006.01) |
| B60K 26/02 | (2006.01) |
| B60T 7/06 | (2006.01) |

(52) U.S. Cl.
CPC ............ B60N 2/0248 (2013.01); B60K 35/00 (2013.01); B60N 2/0228 (2013.01); B62D 1/181 (2013.01); *B60K 2023/005* (2013.01); *B60K 2026/026* (2013.01); *B60K 2370/1438* (2019.05); *B60N 2002/0272* (2013.01); *B60T 7/06* (2013.01); *B62D 1/18* (2013.01)

(58) Field of Classification Search
None
See application file for complete search history.

(56) References Cited

U.S. PATENT DOCUMENTS

| 8,751,065 | B1 | 6/2014 | Kato | |
| 9,079,510 | B2 | 7/2015 | Huber | |
| 9,688,163 | B2 | 6/2017 | Hotary et al. | |
| 2003/0195686 | A1* | 10/2003 | Miller | B60N 2/0252 701/49 |
| 2010/0070143 | A1* | 3/2010 | Schmitt | E05F 15/40 701/49 |
| 2014/0309892 | A1* | 10/2014 | Ricci | H04W 4/21 701/49 |
| 2015/0149042 | A1* | 5/2015 | Cooper | B60R 16/037 701/48 |
| 2015/0197205 | A1 | 7/2015 | Xiong et al. | |
| 2016/0352712 | A1* | 12/2016 | Tamp | H04W 4/44 |

FOREIGN PATENT DOCUMENTS

| CN | 204263965 U | 4/2015 |
| DE | 102011102309 A1 | 1/2012 |

\* cited by examiner

*Primary Examiner* — Lail A Kleinman
(74) *Attorney, Agent, or Firm* — Brooks Kushman PC (57) ABSTRACT

A vehicle includes a controller programmed to identify a seating position in the vehicle corresponding to each of a plurality of nomadic devices in communication with the vehicle. The controller is configured to receive at least one seating profile from each of the nomadic devices and adjust seating parameters for each of the seating positions according to the seating profile received from the corresponding nomadic device.

19 Claims, 3 Drawing Sheets

VEHICLE SEAT MEMORY FROM REMOTE DEVICE

TECHNICAL FIELD

This application generally relates to a system for adjusting vehicle settings based on driver and passenger settings stored in a remote device.

BACKGROUND

Upon entering a vehicle, drivers and passengers may adjust the seat to a desired position. The driver may further adjust mirrors to achieve a safe driving position. Seats may be manually activated by the driver or passenger. Some adjustment mechanisms may be purely mechanical, while others may be electrically assisted. In addition, some vehicles may have the capability to store previous settings in a memory for later retrieval. Users may be able to reprogram a button to memorize and retrieve the current settings. A disadvantage of such systems is that the settings may be overwritten by other drivers or passengers. Further, the settings are only available in the vehicle in which the settings are saved.

SUMMARY

A vehicle includes a controller programmed to identify a seating position in the vehicle corresponding to each of a plurality of nomadic devices in communication with the vehicle, receive at least one seating profile from each of the nomadic devices, and adjust seating parameters for each of the seating positions according to the seating profile received from the corresponding nomadic device.

The controller may be further programmed to output an identifier associated with each of the nomadic devices to a display to request input related to the seating position, and receive a response that is indicative of the seating position corresponding to each of the nomadic devices. The controller may be further programmed to detect a position of each of the nomadic devices within the vehicle and identify the seating position corresponding to each of the nomadic devices according to a position. The at least one seating profile may include a preferred rear child safety lock setting. The at least one seating profile may include a preferred rear window lock setting. The controller may be further programmed to, responsive to identifying the seating position that does not correspond to any of the nomadic devices, adjust the seating parameters according to the seating profile received from the nomadic device corresponding to a driver seating position. The nomadic devices may be configured to store seating profiles for each seating position of the vehicle. The controller may be further programmed to receive the seating position from the corresponding nomadic device. The seating position may be other than a driver seat position. The controller may be further programmed to rescale the at least one seating profile responsive to a vehicle model being different from the vehicle model associated with the at least one seating profile.

A vehicle includes a controller programmed to receive, from a nomadic device, a plurality of seating profiles corresponding to each seating position in the vehicle and corresponding to a vehicle model of the vehicle, and responsive to identifying a seating position associated with the nomadic device in the vehicle, adjust seating parameters for the seating position associated with the nomadic device according to a corresponding seating profile.

The seating profiles may include a preferred rear child safety door lock setting. The seating profiles may include a preferred rear window lock setting. The controller may be further programmed, responsive to receiving a seating profile that does not correspond to the vehicle model of the vehicle, rescale the seating profile such that distances between a seat and a steering wheel and between the seat and a pedal are the same as distances associated with the seating profile. The controller may be further programmed to, responsive to a vehicle identifier being the same as a received vehicle identifier, identify the seating position according to a preferred seating position received from a corresponding nomadic device.

A method includes identifying, by a controller, a seating position corresponding to each of a plurality of nomadic devices in communication with the controller. The method further includes receiving, by the controller, a seating profile from each of the nomadic devices. The method also includes adjusting, by the controller, seating parameters for each seating position according to the seating profile received from the corresponding nomadic device.

The method may further include outputting, to a vehicle touch-screen display, a list of identifiers for each of the nomadic devices, and, receiving, from the vehicle touch-screen display, responses indicative of the seating position for each of the nomadic devices. The method may further include identifying, by the controller, the seating position for each of the nomadic devices based on a strength of a signal received from each of the nomadic devices. The method may further include rescaling, by the controller, the seating profile responsive to a vehicle identifier associated with the controller being different than that associated with the seating profile. The method may further include receiving, by the controller, the seating position from at least one of the nomadic devices.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
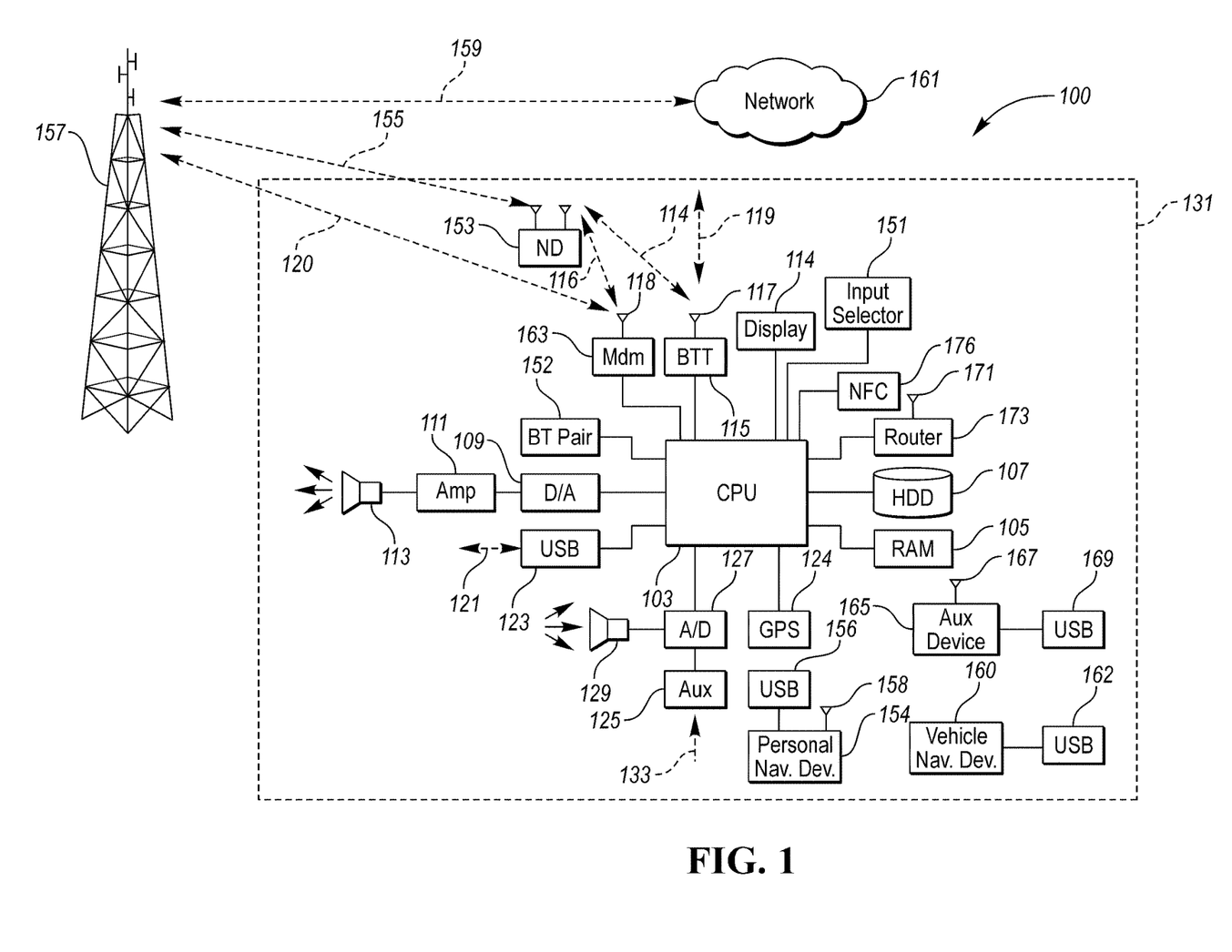
FIG. 1 is a possible configuration of a vehicle communication system.

FIG. 1 illustrates an example block topology for a vehicle-based computing system 100 (VCS) for a vehicle 131. An example of such a vehicle-based computing system 100 is the SYNC system manufactured by THE FORD MOTOR COMPANY. The vehicle 131 enabled with the vehicle-based computing system 100 may contain a visual front-end interface 104 located in the vehicle 131. The user may be able to interact with the interface 104 if it is provided, for example, with a touch sensitive screen. In another illustrative embodiment, the interaction occurs through, button presses, spoken dialog system with automatic speech recognition and speech synthesis.

In the illustrative embodiment shown in FIG. 1, at least one processor 103 controls at least some portion of the operation of the vehicle-based computing system 100. Provided within the vehicle 131, the processor 103 allows onboard processing of commands and routines. Further, the processor 103 is connected to both non-persistent 105 and persistent storage 107. In this illustrative embodiment, the non-persistent storage 105 is random access memory (RAM) and the persistent storage 107 is a hard disk drive (HDD) or flash memory. Non-transitory memory may include both persistent memory and RAM. In general, persistent storage 107 may include all forms of memory that maintain data when a computer or other device is powered down. These include, but are not limited to, HDDs, CDs, DVDs, magnetic tapes, solid state drives, portable USB drives and any other suitable form of persistent memory.

The processor 103 may also include several different inputs allowing the user and external systems to interface with the processor 103. The vehicle-based computing system 100 may include a microphone 129, an auxiliary input port 125 (for input 133), a Universal Serial Bus (USB) input 123, a Global Positioning System (GPS) input 124, a screen 104, which may be a touchscreen display, and a BLUETOOTH input 115. The VCS 100 may further include an input selector 151 that is configured to allow a user to swap between various inputs. Input from both the microphone 129 and the auxiliary connector 125 may be converted from analog to digital by an analog-to-digital (A/D) converter 127 before being passed to the processor 103. Although not shown, numerous of the vehicle components and auxiliary components in communication with the VCS may use a vehicle network (such as, but not limited to, a Controller Area Network (CAN) bus, a Local Interconnect Network (LIN) bus, a Media Oriented System Transport (MOST) bus, an Ethernet bus, or a FlexRay bus) to pass data to and from the VCS 100 (or components thereof).

Outputs from the processor 103 may include, but are not limited to, a visual display 104 and a speaker 113 or stereo system output. The speaker 113 may be connected to an amplifier 111 and receive its signal from the processor 103 through a digital-to-analog (D/A) converter 109. Outputs can also be made to a remote BLUETOOTH device such as a Personal Navigation Device (PND) 154 or a USB device such as vehicle navigation device 160 along the bi-directional data streams shown at 119 and 121 respectively.

In one illustrative embodiment, the system 100 uses the BLUETOOTH transceiver 115 with an antenna 117 to communicate with a user's nomadic device 153 (e.g., cell phone, smart phone, Personal Digital Assistance (PDA), or any other device having wireless remote network connectivity). The nomadic device 153 can then be used to communicate over a tower-network communication path 159 with a network 161 outside the vehicle 131 through, for example, a device-tower communication path 155 with a cellular tower 157. In some embodiments, tower 157 may be a wireless Ethernet or WiFi access point as defined by Institute of Electrical and Electronics Engineers (IEEE) 802.11 family of standards. Exemplary communication between the nomadic device 153 and the BLUETOOTH transceiver 115 is represented by Bluetooth signal path 114.

Pairing the nomadic device 153 and the BLUETOOTH transceiver 115 can be instructed through a button 152 or similar input. Accordingly, the CPU is instructed that the onboard BLUETOOTH transceiver 115 will be paired with a BLUETOOTH transceiver in a nomadic device 153.

Data may be communicated between CPU 103 and network 161 utilizing, for example, a data-plan, data over voice, or Dual Tone Multi Frequency (DTMF) tones associated with nomadic device 153. Alternatively, it may be desirable to include an onboard modem 163 having antenna 118 in order to establish a vehicle-device communication path 116 for communicating data between CPU 103 and network 161 over the voice band. The nomadic device 153 can then be used to communicate over the tower-network communication path 159 with a network 161 outside the vehicle 131, for example, device-tower communication path 155 with a cellular tower 157. In some embodiments, the modem 163 may establish a vehicle-tower communication path 120 directly with the tower 157 for communicating with network 161. As a non-limiting example, modem 163 may be a USB cellular modem and vehicle-tower communication path 120 may be cellular communication.

In one illustrative embodiment, the processor 103 is provided with an operating system including an application programming interface (API) to communicate with modem application software. The modem application software may access an embedded module or firmware on the BLUETOOTH transceiver 115 to complete wireless communication with a remote BLUETOOTH transceiver (such as that found in a nomadic device 153). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Other wireless communication means that can be used in this realm is free-space optical communication (such as IrDA) and non-standardized consumer IR protocols or inductive coupled means including but not limited to near-field communications systems such as RFID.

In another embodiment, nomadic device 153 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Division Multiple Access (CDMA), Time Division Multiple Access (TDMA), Space-Division Multiple Access (SDMA) for digital cellular communication, including but not limited to Orthogonal Frequency-Division Multiple Access (OFDMA) which may include time-domain statistical multiplexing. These are all International Telegraph Union (ITU) International Mobile Telecommunication (IMT) 2000 (3G) compliant standards and offer data rates up to 2 Mbps for stationary or walking users and 385 Kbps for users in a moving vehicle. 3G standards are now being replaced by IMT-Advanced (4G) which offers 100 Mbps for users in a vehicle and 1 Gbps for stationary users. If the user has a data-plan associated with the nomadic device 153, it is possible that the data-plan allows for broad-band transmission and the system could use a much wider bandwidth (speeding up data transfer). In still another embodiment, nomadic device 153 is replaced with a cellular communication device (not shown) that is installed to vehicle 131. In yet another embodiment, the nomadic device 153 may be a wireless local area network (LAN) device capable of communication over, for example (and without limitation), an IEEE 802.11g network (i.e., WiFi) or a WiMax network.

In one embodiment, incoming data can be passed through the nomadic device 153 via a data-over-voice or data-plan, through the onboard BLUETOOTH transceiver 115 and to the vehicle's internal processor 103. In the case of certain temporary data, for example, the data can be stored on the HDD or other storage media 107 until the data is no longer needed.

Additional sources that may interface with the vehicle 131 include a personal navigation device 154, having, for example, a USB connection 156 and/or an antenna 158, a vehicle navigation device 160 having a USB 162 or other connection, an onboard GPS device 124, or remote navigation system (not shown) having connectivity to network 161. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 103 may be in communication with a variety of other auxiliary devices 165. The auxiliary devices 165 can be connected through a wireless (e.g., via auxiliary device antenna 167) or wired (e.g., auxiliary device USB 169) connection. Auxiliary devices 165 may include, but are not limited to, personal media players, wireless health devices, portable computers, and the like.

The CPU 103 may be connected to one or more Near Field Communication (NFC) transceivers 176. The NFC transceivers 176 may be configured to establish communication with compatible devices that are in proximity to the NFC transceivers 176. The NFC communication protocol may be useful for identifying compatible nomadic devices that are proximate the NFC transceivers 176.

Also, or alternatively, the CPU 103 may be connected to a vehicle-based wireless router 173, using for example a WiFi (IEEE 802.11) transceiver/antenna 171. This may allow the CPU 103 to connect to remote networks in range of the local router 173. In some configurations, the router 173 and the modem 163 may be combined as an integrated unit. However, features to be described herein may be applicable to configurations in which the modules are separate or integrated.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
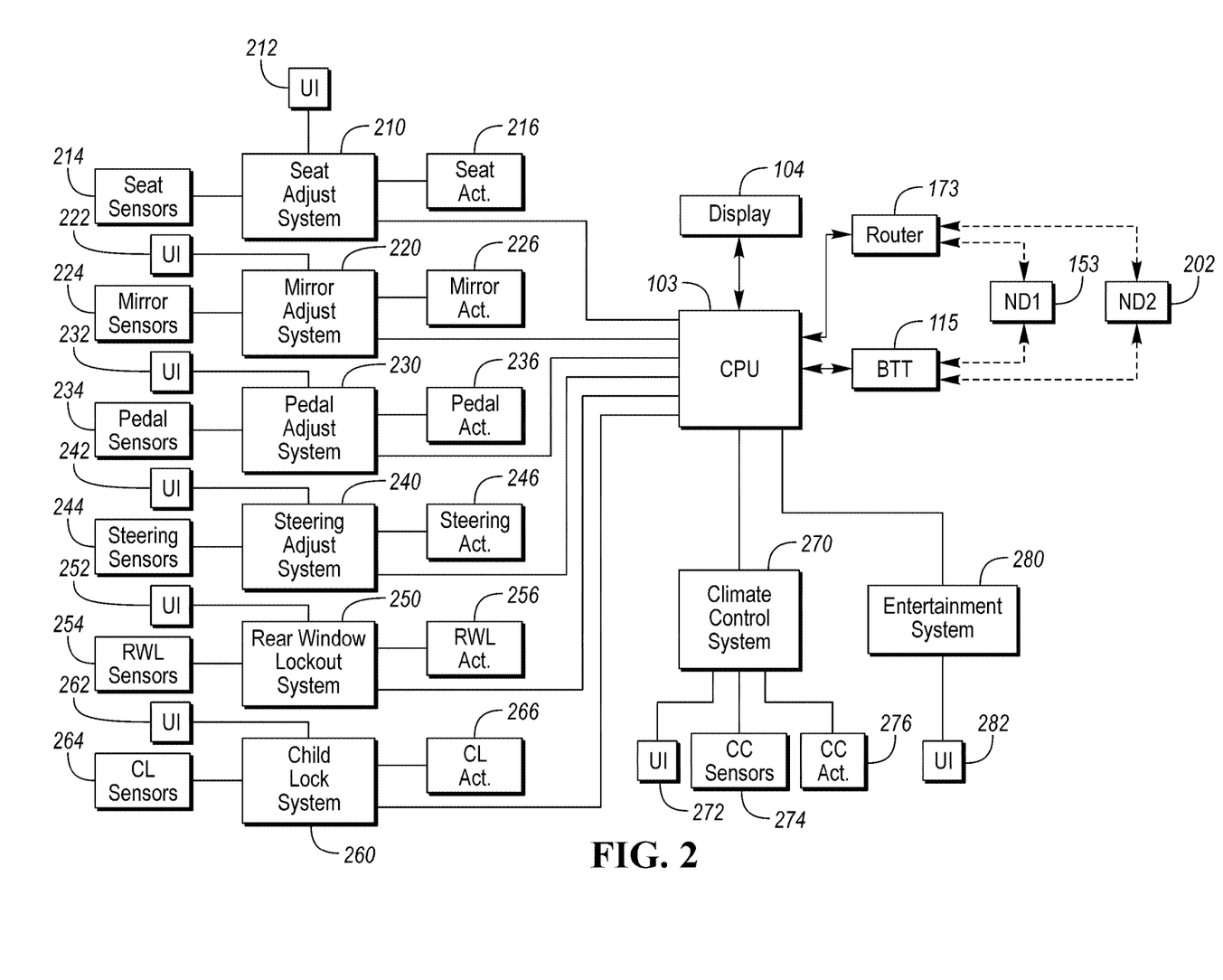
FIG. 2 is a possible configuration of a vehicle for adjusting seating parameters for each seating position in the vehicle.

FIG. 2 depicts a possible configuration of systems for a vehicle 200. The vehicle 200 may include seat adjustment system 210. The seat adjustment system 210 may be configured to change a position of the seats. The seats may include front seats and rear seats. The front seats may include a driver-side seat and a passenger-side seat. The adjustments may include a fore/aft adjustment, a seat back position adjustment, a seat height adjustment, and lumbar support adjustments. The seat adjustment system 210 may include a user interface 212 for an operator to manually position the seats. The user interface 212 may include one or more switches or buttons associated with each of the adjustment parameters. In some configurations, the user interface 212 may be via a touch-screen display (e.g., 104) that displays associated menu items for positioning the seats. Physical switches or buttons may be located on the corresponding seat. In some configurations, the adjustment switches may be located on the nearest door or the center console. An occupant may adjust the position by operating the user interface 221. The seat adjustment system 210 may include a memory function that is configured to, when activated, store the present adjustment settings. The seat adjustment system 210 may include or be interfaced to seat sensors 214. The seat sensors 214 may be configured to measure a position or setting of the seats. For example, the seat sensors 214 may be configured to measure a backrest angle (e.g., relative to a seat bottom), a seat height, and/or a seat distance from a reference point. The seat adjustment system 210 may include or be interfaced to seat actuators 216. The seat actuators 216 may be configured to change a position of the seat. For example, the seat actuators 216 may be configured to adjust a fore/aft position, the seat height, the backrest angle, and a lumbar support of the associated seat. The seat adjustment system 210 may include a controller to manage and coordinate movement of the seats.

The vehicle 200 may include a mirror adjustment system 220. The mirror adjustment system 220 may be configured to position the mirrors in the vehicle. The mirrors may include a rear-view mirror mounted on the windshield and side mirrors mounted on each side of the vehicle. The mirror adjustment system 220 may include a user interface 222 that is configured to allow the operator to adjust the mirror positions. The user interface 222 may include switches or buttons for activating movement of the mirrors. In some configurations, the user interface 222 may be via a touch-screen display (e.g., 104) that displays associated menu items for positioning the mirrors. The mirror adjustment system 220 may include a memory function that is configured to, when activated, store the present adjustment settings. The mirror adjustment system 220 may include or be interfaced to one or more mirror actuators 226, such as electric motors, for moving the mirrors into a desired position. The mirror adjustment system 220 may include or be interfaced to one or more mirror sensors 224 that are configured to measure a position of the mirrors.

The vehicle 200 may include a pedal adjustment system 230. The pedal adjustment system 230 may be configured to position the operating pedals, such as a brake pedal and an accelerator pedal, to a desired position. The pedal adjustment system 230 may include a user interface 232 that is configured to allow the operator to change the position of the pedals. The user interface 232 may include switches or buttons for activating the pedal adjustment system 230. In some configurations, the user interface 212 may be via a touch-screen display (e.g., 104) that displays associated menu items for positioning the pedals. The pedal adjustment system 230 may include a memory function that is configured to, when activated, store the present adjustment settings. The pedal adjustment system 230 may include or be interfaced to one or more pedal actuators 236 that are configured to change the position of the pedals (e.g., electric motors). The pedal adjustment system 230 may include or be interfaced with pedal sensors 234 that are configured to measure a position of the pedals.

The vehicle 200 may include a steering wheel adjustment system 240 that is configured to adjust the position of the steering wheel relative to the operator. For example, the steering wheel adjustment system 240 may be configured to adjust a tilt angle and a distance from the operator. The steering wheel adjustment system 240 may include a user interface 242 that is configured to allow the operator to adjust the position of the steering wheel. In some configurations, the user interface 212 may be via a touch-screen display (e.g., 104) that displays associated menu items for positioning the steering wheel. The user interface 242 may include switches and buttons for activating the system. The steering wheel adjustment system 240 may include a memory function that is configured to, when activated, store the present adjustment settings. The steering wheel adjustment system 240 may include or be interface to one or more steering wheel actuators 246 that are configured to change the position of the steering wheel. The steering wheel adjustment system 240 may include one or more steering wheel position sensors 244 that are configured to measure a position of the steering wheel.

The vehicle 200 may include a rear window lockout system 250 that is configured to restrict opening and closing of the rear windows from the rear seating positions. The rear window lockout system 250 may include a user interface 252. The user interface 252 may include a switch or button to activate the feature. In some configurations, the user interface 212 may be via a touch-screen display (e.g., 104) that displays associated menu items for activating the rear window lockout feature. The rear window lockout system 250 may include or interface to one or more actuators 256 that are configured to restrict the controls for the rear windows. The rear window lockout system 250 may include or interface to one or more rear window lockout sensors 254 that are configured to sense the state of the rear window lockout feature. The rear window lockout system 250 may include a memory function that is configured to, when activated, store the present adjustment settings.

The vehicle 200 may include a child safety lock system 260 that is configured so that rear seat occupants cannot open the rear doors from inside the vehicle when activated. The child safety lock system 260 may include a user interface 262. The user interface 262 may include a switch or button to activate the child safety lock feature. In some configurations, the user interface 212 may be via a touch-screen display (e.g., 104) that displays associated menu items for activating the child safety lock feature. The child safety lock system 260 may include or interface to one or more actuators that are configured to prevent opening the rears doors from inside the vehicle. The child safety lock system 260 may include or interface to one or more sensors 264 that are configured to sense the state of the child safety lock feature. The child safety lock system 260 may include a memory function that is configured to, when activated, store the present adjustment settings.

The vehicle 200 may include a cabin climate control system 270 that is configured to heat and cool the cabin of the vehicle 200. The cabin climate control system 270 may include a user interface 272 that is configured to allow the operator to control the settings of the system. The cabin climate control system 270 may include a multi-zone climate setting that can adjust climate settings in a particular zone of the vehicle. For example, a driver-side zone and a passenger-side zone may be defined. Settings may include a target temperature, a preferred fan speed, and a preferred airflow path (e.g., feet, panel, defrost, or combination thereof). The multi-zone climate setting may allow the temperature and/or airflow to be different in each of the zones. Some vehicles may include climate control adjustments for rear seat passengers. In some configurations, the user interface 212 may be via a touch-screen display (e.g., 104) that displays associated menu items for operating the climate control system 270. The climate control system 270 may include or interface to one or more climate control actuators 276 that are configured to adjust the settings of the climate control system 270. The climate control system 270 may include or interface to one or more climate control sensors 274 that are configured to sense the state of the climate control system and the position of the climate control actuators 276.

The vehicle 200 may further include an entertainment system 280. The entertainment system may include a radio (e.g., FM, AM, satellite) that is configured to receive broadcast programs. The entertainment system 280 may include a user interface 282 that is configured to operate the entertainment system 280. In some configurations, the user interface 212 may be via a touch-screen display (e.g., 104) that displays associated menu items for operating the entertainment system 280. The entertainment system 280 may be configured to store preset channels. For example, an operator may save favorite channels in memory for easy access. In addition, the entertainment system 280 may be configured to store speaker and sound settings. For example, the operator may be configured the side-to-side and front-to-rear speaker balance as well as the frequency response via an equalizer function (e.g., treble and bass settings).

Each of the above described systems may include a corresponding controller that is configured to manage and coordinate the assigned functions. The controllers may be connected to the vehicle network to communicate signals between controllers. The controllers may coordinate to achieve the functions described. For example, the CPU 103 may interface with the display 104. The CPU 103 may implement a menu structure that is applicable to all of the controllers. The CPU 103 may relay menu selections to the controllers. In addition, the CPU 103 may receive status information from each of the controllers for display. Each of the systems may have corresponding control or target parameters. For example, the parameters may define a target position or mode of the associated system.

The CPU 103 may be further configured to store vehicle configuration data in non-volatile memory for later retrieval. Vehicle configuration data may include data from each of the previously described systems. The vehicle configuration data may include data related to the seat adjustment system, the mirror adjustment system, the pedal adjustment system, the steering adjustment system, the rear window lock out system, the cabin climate system, and the child safety lock system. The vehicle configuration data may include one or more seating profiles. The seating profiles may include parameters associated with each of the seating positions. For example, the vehicle configuration data may include a driver seat profile, a passenger seat profile, and a rear seat profile.

The driver seat profile may include parameter settings (may be referred to as seating parameters) for the seat adjustment system 210, the mirror adjustment system 220, the pedal adjustment system 230, the steering adjustment system 240, the rear window lockout system 250, the child safety lock system 260, the climate control system 270, and the entertainment system 280. Parameters from the seat adjustment system 210 may include driver seat position parameters including a fore/aft position, a seat height, a lumbar support setting, a backrest angle, and a headrest position associated with the driver-side seat. Parameters form the mirror adjustment system 220, may include a position of the rear view and side mirrors as described by a horizontal angle and vertical angle relative to a predetermined position for each of the mirrors. Parameters from the pedal adjustment system 230 may include a position for the brake pedal, accelerator pedal, and a clutch pedal. Parameters from the steering wheel adjustment system 240 may include a tilt angle and a telescoping distance of the steering wheel. Parameters from the rear window lockout system may include a desired setting for the rear window lockout feature. Parameters from the child lock safety system may include a desired setting for the child safety lockout feature. Parameters from the climate control system 270 may include a temperature, fan speed, and airflow configuration associated with the driver side. Parameters from the entertainment system 280 may include preset channels, speaker settings, volume settings, and equalization settings. Note that other parameters may also be included.

The passenger seat profile may include parameter settings for the seat adjustment system 210 and the climate control system 270. Parameters from the seat adjustment system 210 may include passenger seat position parameters including a fore/aft position, a seat height, a lumbar support setting, a seatback angle, and a headrest position associated with the passenger-side seat. Parameters from the climate control system 270 may include a temperature, fan speed, and airflow configuration associated with the passenger side. Note that other parameters may also be included.

The rear seat profile may include parameter settings for the seat adjustment system 210, the rear window lockout system 250, the child safety lock system 260, and the climate control system 270. Parameters from the seat adjustment system 210 may include passenger seat position parameters including a fore/aft position, a seat height, a lumbar support setting, a seatback angle, and a headrest position associated with the rear seat. Parameters from the climate control system 270 may include a temperature, fan speed, and airflow configuration associated with the rear seating positions. Parameters from the rear window lockout system may include a desired setting for the rear window lockout feature. Parameters from the child lock safety system may include a desired setting for the child safety lockout feature. For example, the rear window lockout parameter and the child safety lock system parameters may override those of the driver seating profile. This may be desirable when adults are riding in the rear seat instead of children. Note that other parameters may also be included.

The nomadic device 153 may be configured to communicate with the vehicle 200. The nomadic device 153 may include a BLUETOOTH transceiver. For example, the nomadic device may communicate to the vehicle 200 via the BLUETOOTH transceiver 115. The CPU 103 may communicate the vehicle configuration data to the nomadic device 153 for storage in non-volatile memory of the nomadic device 153. The information may also include a vehicle identifier such as a model and model year of the vehicle 200. The nomadic device 153 may be programmed with an application that manages the communication and storage/retrieval of vehicle configuration data.

The nomadic device 153 may store seating profiles for the nomadic device owner for each seating position in the cabin. For example, the nomadic device owner may have preferred settings when sitting in the driver seat and preferred settings when sitting in the passenger seat. The driver-side position may include additional settings that are not available for the other seating positions (e.g., mirror settings, pedal settings). In some cases, the nomadic device 153 may be programmed to apply any applicable driver-side settings to the passenger-side when the nomadic device owner is seated on the passenger side. For example, a person may have a preferred climate system temperature settings that is stored as part of the vehicle configuration data stored for the driver seat position which may be applied to the passenger seat positions. The operator may press a virtual button on the display 104 that initiates the retrieval and application of the present parameters for each of the above described systems. The operator may press another virtual button on the display 104 to communicate the present parameter set to a connected nomadic device 153. In some configurations, multiple virtual buttons may be present to select storage of parameters associated with only the driver seat profile, the passenger seat profile, or the rear seat profile. In this manner, the profiles stored in the nomadic device 153 may include a preferred profile for the device owner in any seating position of the vehicle 200.

The stored vehicle configuration data may include seating profiles for a number of different vehicles or vehicle models. For example, the owner of the nomadic device 153 may own or regularly drive different vehicles. The nomadic device 153 may be configured to store vehicle configuration data associated with each vehicle. The vehicle 200 may be configured to communicate a vehicle identifier to the nomadic device 153 to identify the present vehicle. The vehicle identifier may be compared to vehicle identifiers associated with the vehicle configuration data. The vehicle identifier may include specific vehicle information (e.g., a vehicle identification number) and/or more generic model information (e.g., F150, Fusion, Focus). Upon receiving a vehicle identifier from the vehicle 200, the application running on the nomadic device 153 may retrieve the corresponding vehicle configuration data.

The stored information may include passenger and driver side settings for the nomadic device owner. This allows adjustment to a preferred configuration for any seating position in the vehicle. For each vehicle having a stored configuration, one of the seating positions may be flagged as the default position for the nomadic device owner. For example, a vehicle that the nomadic device owner typically drives may have the driver position flagged as the default position. A vehicle that the nomadic device owner typically rides as a passenger may have the passenger position flagged as the default position. This allows for rapid configuration in the vehicles that have already been configured by the nomadic device owner. For example, upon verifying that the received vehicle identifier matches a stored profile with a default seating position, the nomadic device 153 may immediately send the default seating position parameters to the vehicle 200.

In one possible usage scenario, a vehicle operator approaching the vehicle 200 may be carrying the nomadic device 153. Communication may be established between the vehicle 200 and the nomadic device 153. This communication may be established upon the approach of the operator to the vehicle 200. After establishing communication, the vehicle 200 may communicate identifying information to the nomadic device 153. The nomadic device 200 may search for corresponding vehicle configuration data and communicate the vehicle configuration data to the vehicle 200. The vehicle configuration data may be received and communicated to the various systems. The systems may then adjust the corresponding settings to match the parameters from the configuration data. In the case of a single nomadic device, the system may only apply the driver seat configuration. The system may also apply each seating configuration from the data supplied by the single nomadic device.

Additional usage scenarios may involve multiple vehicle occupants with nomadic devices. The vehicle communication system may be adapted to communicate with a number of nomadic devices. For example, a second nomadic device 202 may be in communication with the vehicle through the BLUETOOTH transceiver 115. The second nomadic device 202 may belong to another person. The second nomadic device 202 may store a set of vehicle configuration data associated with the corresponding device owner. The vehicle configuration data stored may differ from that of the first nomadic device 153. Further, the vehicle configuration data stored in the second nomadic device 202 may be from a different vehicle model. Note that although only two nomadic devices are discussed, the discussion is intended to apply to more than two nomadic devices.

In some configurations, each of the nomadic devices in communication with the vehicle 200 may communicate a device identifier. For example, the device identifier may be the name of the device owner. The device identifier may be assigned by the device owner via the application program running on the nomadic device. Responsive to receiving the device identifier, the CPU 103 may display the device identifier on the display 104. When multiple device identifiers are received, the display 104 may list each one. The CPU 103 may be programmed to permit assignment of each of the device identifiers to a seating position in the vehicle 200. For example, by operating the touch-screen display 104, the device identifiers may be assigned to a seating location. Upon assignment of a seating location, the corresponding vehicle configuration data may be requested from the corresponding nomadic device. In this manner, each occupant of the vehicle 200 may have a nomadic device that stores vehicle configuration data for each seating position. Once the seating position of the device owner is known, the corresponding seating profile may be transferred to the vehicle 200. The various vehicle systems may be commanded to the apply the parameters for each of the seating positions. In this manner, each device owner has preferred seating configurations stored in their own personal nomadic device. In practice, the device owner could enter any compatible vehicle in any seating position and have their personal seating preferences recognized.

In other configurations, the nomadic device 153 may be programmed to display a message that communication has been established with the vehicle 200. A menu of seating positions may be displayed for the device holder to select. For example, a list of items such as "Driver Seat", "Passenger Seat", and "Rear Seat" may be displayed. The device holder may select the desired seating position. Upon selecting the seating position, the nomadic device 153 may be programmed to communicate the corresponding seating profile the vehicle 200. The nomadic device 153 may also provide a seating position identifier with the seating profile to identify the seating position. The CPU 103 may then command the various systems to apply the received parameters. In this manner, the parameters for each seating position may be set according to the preferences of each seat occupant.

In some configurations, the vehicle communication system may be configured to automatically detect the position of each of the nomadic devices within the vehicle. The system may be configured to detect which side and door of the vehicle that the nomadic device entered the vehicle. For example, the CPU 103 may be configured to receive a signal strength from each of the nomadic devices. The signal strength may indicate a magnitude of the communication signal received from the vehicle transceiver. The position of the nomadic device relative to the transceiver may be ascertained by analyzing the signal strength. In some configurations, multiple BLUETOOTH transceivers may be located at various locations (e.g., each door) and may be used to monitor and compare signal magnitudes received from the nomadic devices. In other examples, a NFC transceiver may be located proximate to each seating position. The NFC may establish communication when the nomadic device is within a predetermined distance of the transceiver. To facilitate the NFC protocol, nomadic device holders may be placed near each seating position. A person entering the vehicle may place their nomadic device in or near the corresponding holder and communication may be established.

In some configurations, GPS data from the nomadic devices and the vehicle may be used to determine an approach direction for each of the nomadic devices. In addition, information from the doors may be used to determine an entry portal for each of the nomadic devices. For example, a sensor may detect when a door is opened or closed.

The nomadic device 153 may be programmed to adjust the seating profiles to deliver a customized seating profile. For example, a vehicle owner may have a preferred seating profile for a vehicle in which they own. Such a setting may be arrived at over time by adjustment of the various parameters. The vehicle configuration data for this vehicle may be stored in the nomadic device of the vehicle owner. The vehicle owner may rent a vehicle that is different than the vehicle they own. For example, the owned vehicle may be a small car and the rental vehicle may be a large truck. As such, the stored vehicle configuration data may not correspond exactly to the settings for the rental vehicle. The nomadic device 153 may be configured to rescale the stored vehicle configuration data to generate a seating profile that is similar in the rental vehicle.

The vehicle configuration data may be normalized so that certain relative distances may be obtained. In such configurations, normalized configuration parameters may be communicated to the vehicle. The vehicle may then adjust the corresponding parameter settings based on the vehicle measurements and calibrations to achieve the normalized positions. By normalizing the positions, it becomes possible to provide the configuration to any vehicle. For example, the occupant may transition between a small economy car and a large truck and have the preferred settings without having to readjust and store parameters for each type of vehicle.

The normalized vehicle configuration data may include various measurements that correspond to the preferred driving position or seating position. The driver-side configuration data may include parameters indicating the seat position relative to the pedals and the steering wheel. For example, seat to steering wheel parameters may be indicated with a distance between the seat bottom (e.g., top/front portion) and the steering wheel (e.g., bottom-most position) and a distance between the seat back and steering wheel. The parameters may further include seat to pedal parameters. The seat to pedal parameters may include a horizontal and vertical distance between the seat bottom (e.g., top/front portion) and the pedals. The driver-side parameters may further include seat to mirror parameters. The parameters may include a distance between the seat bottom and the lower-most part of the side window or windshield. The parameters may include a seat back to seat bottom angle (e.g., recline angle). The seat to mirror parameters may include an angle relative to the seat position and an angle relative to the vehicle height. Other parameters may include a steering wheel angle relative to the seat or the dashboard. Other parameters may also include a distance between the seat bottom (e.g., top portion) and floor, and a distance between seat bottom (e.g., front) and the dashboard/front seat. The parameters may include distance between the seat bottom and an armrest (e.g., on center console and/or doors). A subset of these parameters may be applicable to the passenger seating positions.

The vehicle and/or nomadic device may convert between the normalized parameters and the vehicle-specific parameters. Parameter data may be stored as normalized data and/or vehicle-specific data. The vehicle systems may be calibrated so that the associated components may be adjusted to achieve the desired parameter settings. For example, the systems may utilize the corresponding sensor signals to determine the position or status of the associated components (e.g., seat position, pedal position). Each vehicle type may include vehicle-specific parameters for the normalization data. Each vehicle may have a predefined range of movement for each of the components. For example, the seat height may be adjusted between a minimum and maximum distance from the floor. Other vehicle-specific data may include height of the windows and armrests from the floor of the vehicle. The vehicle and/or nomadic device may access the cloud or external network to download vehicle-specific dimensions for each vehicle for use in the normalization operation.

Each vehicle may store or access vehicle and system dimensions. Once the desired parameters are known, the seat, mirror, steering wheel, and pedals may be adjusted to the normalized positions. The nomadic device and/or the vehicle may store the normalized parameters and/or the actual parameter values. The nomadic device and/or the vehicle may be configured to rescale the parameters for any vehicle for which vehicle-specific data is available.

Figure 3:
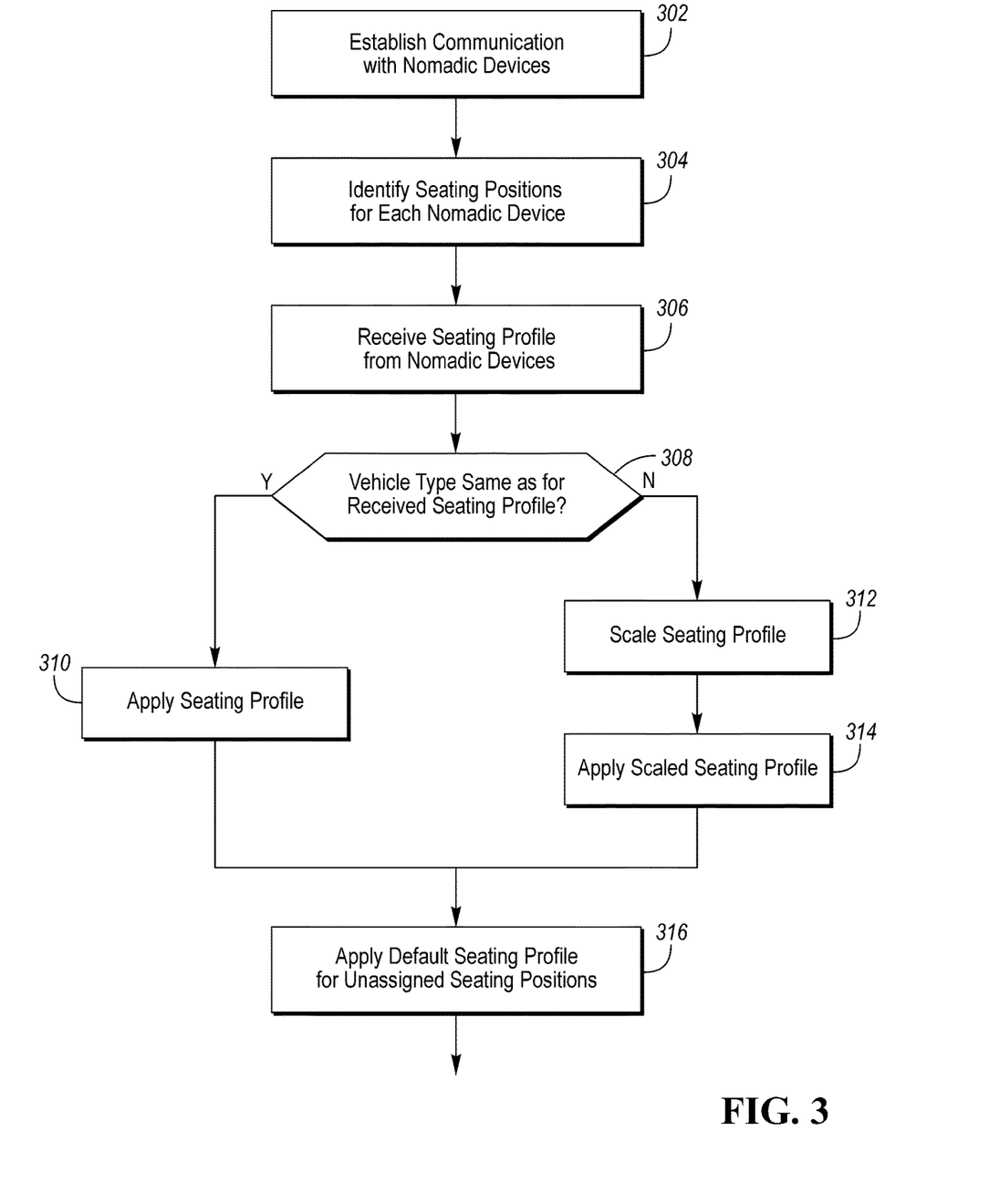
FIG. 3 is a flowchart for a possible sequence of operations for adjusting the seating parameters for each seating position.

FIG. 3 depicts a flowchart for a possible set of operations that may be performed by the vehicle control system. At operation 302, the CPU 103 may establish communications with a plurality of nomadic devices. For example, the CPU 103 may communicate vehicle identification information and the nomadic devices may respond with an indication that seating profiles are available. At operation 304, the CPU 103 may identify the seating positions for each of the nomadic devices for which communication has been established. Identification of the seating positions may be as described previously herein. The CPU 103 may request a specific seating profile from each of the nomadic devices based on the identified seating position. At operation 306, the CPU 103 may receive the corresponding seating profile from each of the nomadic devices. At operation 308, the CPU 103 may check to determine if the received seating profile is compatible with the vehicle. For example, the vehicle type may be compared to the vehicle type associated with the received seating profile. If the received seating profile is compatible with the vehicle, operation 310 may be performed to apply the seating profile. If the received seating profile is not compatible with the vehicle, then operation 312 may be performed to scale the seating profile as described previously herein. At operation 314, the scaled seating profile may be applied.

At operation 316, a default seating profile may be applied for any unassigned seating positions. An unassigned seating position may be a seating position for which no nomadic device profile is associated with. In this case, the exiting settings may be retained. The operations may be repeated until all seating positions are assigned and configured.

The system described provides several advantages over prior systems. A vehicle owner may be store seating configurations for each seating position in the vehicle. These seating configurations may be retained and applied to other vehicles as well. Customer satisfaction is improved as the customer is provided with a consistent experience over a range of vehicles. Further, customers are provided with the same comfort level in any seating position of any vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a controller programmed to identify a seating position in the vehicle corresponding to each of a plurality of nomadic devices in communication with the controller by outputting an identifier associated with each of the nomadic devices to a display and requesting user input to identify the seating position, receive a response via the display that is indicative of the seating position corresponding to each of the nomadic devices, receive at least one seating profile from each of the nomadic devices, and adjust seating parameters for each of the seating positions according to the seating profile received from the corresponding nomadic device.

2. The vehicle of claim 1 wherein the controller is further programmed to detect a position of each of the nomadic devices within the vehicle and identify the seating position corresponding to each of the nomadic devices according to a position.

3. The vehicle of claim 1 wherein the at least one seating profile includes a preferred rear child safety lock setting.

4. The vehicle of claim 1 wherein the at least one seating profile includes a preferred rear window lock setting.

5. The vehicle of claim 1 wherein the controller is further programmed to, responsive to recognizing at least one seating position without a corresponding nomadic device, adjust the seating parameters of the at least one seating position according to the seating profile received from the nomadic device corresponding to a driver seating position.

6. The vehicle of claim 1 wherein the nomadic devices are configured to store seating profiles for each seating position of the vehicle.

7. The vehicle of claim 1 wherein the controller is further programmed to receive the seating position from the corresponding nomadic device.

8. The vehicle of claim 1 wherein the seating position is other than a driver seat position.

9. The vehicle of claim 1 wherein the controller is further programmed to rescale the at least one seating profile responsive to a vehicle model being different from the vehicle model associated with the at least one seating profile.

10. A method comprising:
outputting to a vehicle touch-screen display, by a controller, a list of identifiers for each of a plurality of nomadic devices in communication with the controller and receiving, from the vehicle touch-screen display, responses indicative of a seating position for each of the nomadic devices to identify the seating position for each of the nomadic devices;
receiving, by the controller, a seating profile from each of the nomadic devices; and
adjusting, by the controller, seating parameters for each seating position according to the seating profile received from the corresponding nomadic device.

11. The method of claim 10 further comprising identifying, by the controller, the seating position for each of the nomadic devices based on a strength of a signal received from each of the nomadic devices.

12. The method of claim 10 further comprising rescaling, by the controller, the seating profile responsive to a vehicle identifier associated with the controller being different than that associated with the seating profile.

13. The method of claim 10 further comprising receiving, by the controller, the seating position from at least one of the nomadic devices.

14. The method of claim 10 further comprising, responsive to a vehicle identifier being same as a received vehicle identifier, identifying the seating position according to a preferred seating position received from a corresponding nomadic device.

15. The vehicle of claim 10 wherein the seating profiles include a preferred rear child safety door lock setting.

16. The vehicle of claim 10 wherein the seating profiles include a preferred rear window lock setting.

17. The vehicle of claim 10 wherein the seating profiles include distances between a seat and a steering wheel and between the seat and a pedal.

18. The vehicle of claim 1, wherein the at least one seating profile includes distances between a seat and a steering wheel and between the seat and a pedal.

19. The vehicle of claim 1, wherein the controller is further programmed to, responsive to a vehicle identifier being same as a received vehicle identifier, identify the seating position according to a preferred seating position received from a corresponding nomadic device.

* * * * *